2,974,114

FILM FORMING COMPOSITION CONTAINING POLYVINYLACETATE AND POLYVINYL ISOBUTYL ETHER

Robert Steckler, Chagrin Falls, Ohio, and Francis J. Prescott, Flushing, N.Y., assignors to General Aniline & Film Corporation, New York, N.Y., a corporation of Delaware No Drawing. Filed Apr. 16, 1958, Ser. No. 728,778

5 Claims. (Cl. 260—29.6)

The present invention relates to an improved polyvinyl acetate film forming composition having excellent wash and scrub resistance.

It is known that polyvinyl acetate is employed in the preparation of coating compositions for various surfaces. These compositions may comprise water emulsions of extremely finely divided particles of polyvinyl acetate, pigment, fillers and other materials to improve setting and drying characteristics. Instead of water emulsions, the surface coating compositions may be prepared by dissolving polyvinyl acetate in one or more of a wide selection of organic solvents such as alcohols, ether-alcohols, ketones, nitro paraffins, aromatic hydrocarbons, chlorinated hydrocarbons and the like, or mixtures thereof. To such solutions conventional plasticizers are added together with pigment and filler. The nature or character of the pigment is immaterial whether it be of inorganic or organic origin so long as it is compatible and readily dispersed in a solution or emulsion of polyvinyl acetate. Regardless of the manner of preparation, commercially available polyvinyl acetate coating compositions, whether in solution or dispersed or emulsified form, have one characteristic disadvantage in that the films resulting from such compositions either by spraying, brush applications, etc. are readily weakened and in many cases deteriorate when subjected to washing or scrubbing. When such compositions are employed as exterior coatings, the films are partly washed away during the rainy, spring and fall seasons. This is also true when such compositions are employed as interior coatings particularly on kitchen walls and ceilings. In the latter case, it is necessary at times to wash the walls and ceilings with soap and water in order to remove the grease film that might have formed as a result of cooking. In short, all of the present day commercially available coating compositions containing polyvinyl acetate as the film forming susbtance, do not possess wash and scrub resistance.

It is an object of the present invention to provide an improved polyvinyl acetate coating composition, the films of which have excellent wash and scrub resistance, whether employed externally or internally.

Other objects and advantages will become more clearly manifest from the following description.

We have found that by the addition of 2 to 20% by weight of polyvinyl isobutyl ether based on the weight of total solids to any of the commercially available polyvinyl acetate coating compositions, a film, after surface application of the composition, is obtained which displays unusual resistance to washing and scrubbing with water, soapy water and soapy water high on the alkaline side and containing detergents. The unusual feature of the compositions prepared in accordance with the present invention is that the polyvinyl isobutyl ether is compatible with all types of polyvinyl acetate coating compositions regardless of the type of components such as pigments, plasticizers, etc., employed in their formulation.

The polyvinyl isobutyl ether which we have found to impart unusual washability and scrub resistance to dried films of polyvinyl acetate is characterized by the following general formula:

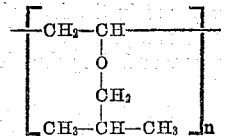

wherein $n$ represents the extent of polymerization and is indicated by a K value of 10 to 90 and a molecular weight ranging from 10,000 to 250,000.

The polyvinyl isobutyl ether may be added in the aforementioned concentration as 100% material or as a 35 to 60% solution in organic solvents or as an emulsion in water.

The polyvinyl acetate constituting all of the present day solutions or water emulsions and employed as surface coatings has a viscosity ranging from 1,000 to 2,000 cps. at room temperature. Commercially available polyvinyl acetate-water emulsions consist of extremely finely divided particles of polyvinyl acetate ranging in molecular weight of from approximately 10,000 to 250,000 wherein the concentration is in the range of 40 to 60% solids. The particle size of the polyvinyl acetate may range from 0.01 to 0.3 micron. Instead of water emulsions, polyvinyl acetate compositions are prepared by dissolving the polyvinyl acetate in one or more of a wide variety of organic solvents such as the lower alkyl alcohols, ethers, ketones, nitro paraffins and the like, and in mixtures thereof. Specific solvents which impart excellent flexibility to the dried polyvinyl acetate include acetone, dioxane, butyl acetate, methyl cellosolve, toluene, xylene, dichloroethyl ether, ethanol and the like. When employed in solution form conventional plasticizers are normally added, such as, for example, diethylene glycol-adipate, the reaction product of equal moles of diethylene glycol and adipic acid, which is commercially available under the brand name of Resoflex R-296 and has an acid number of 32 and a viscosity (Gardner-Holt) of Z-2.

As pointed out above, the polyvinyl isobutyl ether characterized by the foregoing general formula is not only compatible with polyvinyl acetate-water emulsions but also compatible with polyvinyl acetate when formulated with the usual mixture of organic solvents and plasticizers. In both types of formulations, the polyvinyl isobutyl ether greatly improves the physical properties of the dried polyvinyl acetate films with respect to washability and scrub resistance. This is very unexpected and surprising since polyvinyl isobutyl ether by itself absorbs water slowly at room temperature and may even be considered slightly hygroscopic.

In order to more clearly illustrate the manner in which the present invention may be practiced, the following examples are given. It is to be clearly understood however, that these examples are merely illustrative and are not to be construed as limiting the invention described and claimed herein. All the parts given are by weight.

EXAMPLE I

To a pebble mill there were charged 2 parts of an emulsifying agent commercially prepared by condensing 1 mole of naphthalene sulfonic acid with 1 mole of formaldehyde and the resulting product neutralized with a sufficient amount of caustic soda. To this were added 156 parts of water, 2 parts of ethoxylated castor oil containing 30 moles of ethylene oxide and 35 parts of diethylene glycol monoethyl ether. To this mixture were then added 50 parts of a 2% aqueous solution of methyl cellulose having a viscosity of 4,000 cps., 200 parts of titanium dioxide pigment, 75 parts of finely divided talc and 75 parts of diatomaceous earth and the mixture intimately dispersed. After dispersion, the mixture was reduced with 56 parts of water and 130 parts of a 2% aqueous solution of methyl cellulose having the viscosity of 4000 cps.

To 613 parts of the above prepared pigment dispersion there were added 225 parts of polyvinyl acetate emulsion which had been prepared in the following manner:

A 3 necked flask equipped with thermometer, agitation, reflux condenser, and dropping funnel was charged with:

44.5 parts water
0.3 part nonionic emulsifier, a reaction product of 10 moles of ethylene oxide and 1 mole of nonyl phenol
0.2 part potassium persulfate
2.0 parts hydroxyethyl cellulose (viscosity of 5% aqueous solution at 20° C. 70-110 cps.)

The mixture was heated to 70° C. under nitrogen blanket and to it were added gradually during 2½-3 hours at 70° C. 53 parts of freshly distilled vinyl acetate monomer. The temperature was about 90° C. thus indicating a very low monomer content and completion of polymerization. The resulting emulsion has the following physical properties:

Viscosity, Brookfield 20 r.p.m.
at 70° F. _____ 4600 cps.
Non-volatiles _____ 55%.
Particle size _____ Below 1 micron.

The foregoing basic polyvinyl acetate-pigment emulsion was used as the test standard to which various proportions of polyvinyl isobutyl ether and the usual plasticizer were added.

EXAMPLE II

To 84 parts of the polyvinyl acetate-pigment emulsion of Example I there were added 2½ parts of Resoflex R-296. The emulsion as now constituted merely contains one of the usual plasticizers for the polyvinyl acetate film.

EXAMPLE III

To 84 parts of the polyvinyl acetate-pigment emulsion of Example I there were added 1.3 parts of Resoflex R-296 and 2.5 parts of a 50% solution of polyvinyl isobutyl ether in toluol. The polyvinyl isobutyl ether had a molecular weight of 11,000.

EXAMPLE IV

To 84 parts of the polyvinyl acetate-pigment emulsion of Example I there were added 1.9 parts of Resoflex R-296 and 1.3 parts of a 50% solution of polyvinyl isobutyl ether in toluol. The polyvinyl isobutyl ether had a molecular weight of 11,000.

EXAMPLE V

To 84 parts of the polyvinyl acetate-pigment emulsion of Example I there were added 2.2 parts of Resoflex R-296 and .6 part of a 50% solution of polyvinyl isobutyl ether in toluol. The polyvinyl isobutyl ether had a molecular weight of 11,000.

A separate film of each of the compositions of Examples II to V inclusive, was deposited on a sand-blasted glass panel 8" x 18" and a film gauge of 6 mil. clearance. The film on each panel was permitted to air dry for one week. Thereafter, a conventional scrub test was conducted while using an arc type tester at 40 strokes per minute with a Chinese hog bristle brush. The brush was soaked in water for ½ hour prior to the start of the scrubbing test. The weight of the brush was so adjusted as to total 1 pound. During the test a ½% aqueous solution of Ivory soap was added dropwise to keep both the brush and film surface wet. A similar scrub test was conducted on coated panels with plain water. Although many variations of this particular test are in use, the procedure employed herein has been found very satisfactory and acceptable by the trade. The results obtained as a result of this test are shown in the following table:

Table

|  | Examples | | | |
|---|---|---|---|---|
|  | 2 | 3 | 4 | 5 |
| Scrub Test: ½% Ivory Soap Solution: | | | | |
| Initial Tear | 129 | 212 | 295 | 420 |
| 1" Tear | 132 | 255 | 230 | 628 |
| 4" Tear | 136 | 378 | 325 | 630 |
| Complete Failure | 138 | 400 | 483 | 634 |
| Scrub Test: Water Only: | | | | |
| Initial Tear | 145 | 527 | 280 | 215 |
| 1" Tear | 180 | 629 | 400 | 270 |
| 4" Tear | 340 | 1,160 | 780 | 484 |
| Complete Failure | 586 | 1,245 | 1,015 | 700 |

From the results shown in the foregoing table, it is clearly evident that the use of at least 10 parts of polyvinyl isobutyl ether in a polyvinyl acetate composition containing 100 parts by weight of solids gives excellent results in the scrub test using only water. It is also evident from the table that in the scrub test using soap solution, the use of at least 2.5 parts of polyvinyl isobutyl ether in a polyvinyl acetate composition containing 100 parts of solids gives maximum results.

The following example will illustrate the use of polyvinyl isobutyl ether in a solvent system of polyvinyl acetate:

EXAMPLE VI 250 parts by weight of non-chalking titanium dioxide pigment, available commercially under the brand name of Titanox RANC, was uniformly dispersed in a vehicle consisting of the following composition:

Parts
Polyvinyl acetate having a viscosity of 17-21 seconds (viscosity determined in a No. 4 Ford cup in a 20% solution of acetone at 25° C.) _____ 246
Toluene _____ 510
Polyvinyl isobutyl ether having a molecular weight of 20,000 _____ 20
Dibutyl phthalate _____ 40

Films of the above white paint were deposited in accordance with the procedure given in Example V and subjected to the wash and scrub test. The results obtained are as follows:

Scrub test. ½% Ivory soap solution: Number of strokes
Initial tear _____ 218
1" tear _____ 260
4" tear _____ 380
Complete failure _____ 410
Scrub test: Water only:
Initial tear _____ 530
1" tear _____ 630
4" tear _____ 1172
Complete failure _____ 1255

While the foregoing examples have been directed to polyvinyl acetate coating compositions, the polyvinyl isobutyl ether in the aforestated concentration may also be added to coating compositions containing copolymers or terpolymers of vinyl acetate with crotonic or acrylic acid or other polymerizable vinyl monomers to yield modified acetate copolymers which can be applied from an alkaline aqueous solution and which will show the same excellent wash and scrub resistance. When employing such copolymers as the film forming material in either aqueous emulsion or in organic solvents, the nature or character of the pigment and vehicle components is immaterial since we have found that the polyvinyl isobutyl ether is compatible and will yield excellent wash and scrub resistance.

We claim:
1. A polyvinyl acetate film forming composition having improved wash and scrub resistance comprising polyvinyl acetate, pigment and vehicle carrier selected from the class consisting of water and organic solvents in which the said polyvinyl acetate is soluble therein, said composition containing from 2 to 20% by weight based on the weight of the total solids of said composition of a polyvinyl isobutyl ether having the following general formula:

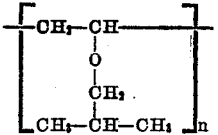

wherein $n$ represents the extent of polymerization and indicated by a molecular weight ranging from 10,000 to 250,000.

2. A polyvinyl acetate film forming composition having improved wash and scrub resistance comprising an emulsion of polyvinyl acetate and pigment, said emulsion containing from 2 to 20% by weight based on the weight of the total solids of said emulsion of a polyvinyl isobutyl ether having the following general formula:

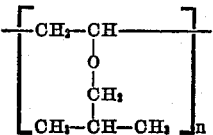

wherein $n$ represents the extent of polymerization and indicated by a molecular weight ranging from 10,000 to 250,000.

3. A polyvinyl acetate film forming composition having improved wash and scrub resistance comprising a solution of polyvinyl acetate having dispersed therein a pigment, said solution containing from 2 to 20% by weight based on the weight of the total solids of said solution of a polyvinyl isobutyl ether having the following general formula:

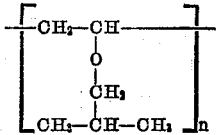

wherein $n$ represents the extent of polymerization and indicated by a molecular weight ranging from 10,000 to 250,000.

4. A polyvinyl acetate film forming composition according to claim 1 wherein the poly vinyl isobutyl ether has a molecular weight of 11,000.

5. A polyvinyl acetate film forming composition according to claim 3 wherein the polyvinyl isobutyl ether has a molecular weight of 20,000.

References Cited in the file of this patent

UNITED STATES PATENTS

| | | |
|---|---|---|
| 2,444,396 | Collins et al. | June 29, 1948 |
| 2,481,100 | Fox | Sept. 6, 1949 |
| 2,786,821 | Gardner | Mar. 26, 1957 |
| 2,888,422 | Johnson et al. | May 26, 1959 |

FOREIGN PATENTS

| | | |
|---|---|---|
| 500,872 | Great Britain | Feb. 13, 1939 |
| 705,104 | Germany | Apr. 17, 1941 |
| 50,141 | Holland | Apr. 15, 1941 |

OTHER REFERENCES

"British Plastics," page 260, June 1947.